(12) United States Patent
Meyers et al.

(10) Patent No.: US 7,353,148 B1
(45) Date of Patent: Apr. 1, 2008

(54) GENERATION OF DISPLAYS OF SOLUTIONS TO PHYSICS PROBLEMS REPRESENTED BY COMPLEX MATHEMATICAL EQUATIONS USING QUANTUM COMPUTATIONS OR SIMULATION OF QUANTUM COMPUTATIONS ON CLASSIC COMPUTERS

(75) Inventors: Ronald E. Meyers, Columbia, MD (US); Keith S. Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 497 days.

(21) Appl. No.: 10/911,656

(22) Filed: Aug. 5, 2004

Related U.S. Application Data

(60) Provisional application No. 60/493,096, filed on Aug. 6, 2003, provisional application No. 60/493,106, filed on Aug. 6, 2003.

(51) Int. Cl.
*G06F 7/60* (2006.01)
(52) U.S. Cl. .............................. 703/2; 703/13; 703/21; 977/902; 977/932; 977/933
(58) Field of Classification Search ................ 703/2, 703/13, 21; 713/150, 161, 168, 190, 300, 713/340; 257/31, 32, 33, 34, 35, 36, 798
See application file for complete search history.

(56) References Cited

U.S. PATENT DOCUMENTS 6,081,882 A    6/2000    Gossett (Continued)

FOREIGN PATENT DOCUMENTS

JP    2001357026 A    12/2001

OTHER PUBLICATIONS

Berman et al. "Simulation of the diffusion equation on a type-II quantum computer" Physical Review A, 66,012310 (2002).

(Continued)

*Primary Examiner*—Paul Rodriguez
*Assistant Examiner*—Jonathan J Teets
(74) *Attorney, Agent, or Firm*—Edward L. Stolarun; Richard A. Morgan

(57) ABSTRACT

Graphic displays or audio sound representations of numerical solutions of physics problems modeled by complicated, computationally complex mathematics are generated by Type I and Type II quantum computers, which employs a plurality of classically interconnected nodes each consisting of relatively few qubits, or classical computers emulating Type I and Type II quantum computers. This is done by setting the boundary conditions so that conservation is maintained within a high precision and performing multi-demensional computations as a series of single dimensional computations employing pseudo-random number generators on a classical computer to simulate the stochastic nature of the quantum process. On a quantum computer randomness is supplied the quantum process direction. An operator U on a quantum wavefunction $\Psi$ ensures that, to the limit of experimental accuracy on a real quantum computer, the Hermitian inner product $\langle\Psi|\Psi\rangle$ is conserved, establishing the nature of the operations as unitary to emulate the quantum condition. Measurement of the wavefunction at a node is simulated on a classical computer while on a quantum computer the wavefunction is measured, the information developed in the simulation is exchanged with nearby modes, and the process is repeated until complete.

42 Claims, 4 Drawing Sheets

U.S. PATENT DOCUMENTS

| | | | |
|---|---|---|---|
| 6,188,964 B1 | 2/2001 | Reister et al. | |
| 6,317,766 B1 * | 11/2001 | Grover | 708/400 |
| 6,456,994 B1 | 9/2002 | Tucci | |
| 6,578,018 B1 * | 6/2003 | Ulyanov | 706/14 |
| 6,766,062 B1 | 7/2004 | Donoho et al. | |
| 2003/0101149 A1 | 5/2003 | Jaeger | |
| 2003/0121028 A1 | 6/2003 | Coury et al. | |
| 2003/0169041 A1 * | 9/2003 | Coury et al. | 324/307 |

OTHER PUBLICATIONS

Boghosian et al. "Quantum lattice-gas model for the many-particle Schrodinger equation in d dimensions" Physical Review E, 57(1) 54-66 (Jan. 1998).

Meyer "From quantum cellular automata to quantum lattice gases" J. Stat Phys., 85, 551-574 (1996).

Meyer "Quantum computing classical physics" Philosophical Transactions of the Royal Society of London A, 360, 395-405 (2002).

Meyers "Quantum Communications and Quantum Computing for C4I" Proceedings 2002 Army Science Conference, Orlando, FL 2002.

Yepez "Quantum lattice-gas model for the Burgers equation" Journal of Statistical Physics, 107, N1, 203-224 (2002).

Yepez "Type-II Quantum Computers" International Journal of Modern Physics C, 12(9) 1273-1284 (2001).

Yepez "An efficient and accurate quantum lattice-gas model for the many-body Schroedinger wave equation" Computer Physics Communications, 146(3) 280-294 (2002).

Meyers "Quantum PDE's and the Simulation of Quantum Computers Solving Physics Problems" Atlas Mathematical Conference Abstracts, Document #cakr-91 (2003).

Meyers et al. "Simulation of Turbulence Using the Stabilization Principle" Abstract—Session BJ-Numerical Simulations I (1997).

Yepez "An efficient and accurate quantum algorithm for the Dirac equation" quant-ph/0210093 (Oct. 2002).

* cited by examiner

GENERATION OF DISPLAYS OF SOLUTIONS TO PHYSICS PROBLEMS REPRESENTED BY COMPLEX MATHEMATICAL EQUATIONS USING QUANTUM COMPUTATIONS OR SIMULATION OF QUANTUM COMPUTATIONS ON CLASSIC COMPUTERS

RELATED APPLICATIONS

This application claims priority of U.S. Provisional Patent Applications Ser. No. 60/493,096 filed Aug. 6, 2003, and Ser. No. 60/493,106 filed Aug. 6, 2003, which are incorporated herein by reference.

GOVERNMENT INTEREST

The invention described herein may be manufactured, used, and licensed by or for the United States Government.

FIELD OF THE INVENTION

This invention relates to methods and apparatus for generating graphic displays and audio sound representations representing solutions of physical problems using quantum computers and classical computers for performing simulations of quantum computers and to methods of computation using such computers to generate solutions to complex physics problems modeled by mathematics.

BACKGROUND OF THE INVENTION

In a wide variety of situations it would be useful to have graphical outputs representing the solutions of mathematical equations modeling phyical processes. Some physics problems can be represented by relatively simple mathematics and can be implemented on normal or classical computers (in contrast to quantum computers) in real time with the output provided as still images, video images, movies, audio sound representations or the like illustrating the resulting physical phenomena. In other cases the mathematics is so complex that it cannot be effectively solved using classical computers. This has led to the investigation of quantum computers which would employ a large number of entangled qubits to achieve exponentially large computation rates. Even without large numbers of entangled qubits, quantum computers can still provide significant computational advantages. The practical difficulty of implementing quantum computers has led to the investigation of classical computers which emulate quantum computers. Such computers might simulate processes that are intractable for ordinary classic computation processes such as the physics of fluid transport, electrodynamic motion, biological processes, weather phenomena, etc. However, other equivalent formulations, processes, and configurations will be apparent to those skilled in the arts.

These computations could have widespread practical application. For example, simulation of gas flows about complex geometries such as represented by irregular terrain and built-up urban areas would be valuable for industrial and military processes. However, other equivalent formulations, processes, and configurations will be apparent to those skilled in the arts.

SUMMARY OF THE INVENTION

The present invention is accordingly directed toward a system for generating graphic images representing the outputs of the solutions to dynamic physics processes taking the form of still images, videos, movies, audio sound representations and the like employing quantum computers or classical computers solving complex wave-based mathematical equations in such a way as to emulate quantum computers. In particular, the systems of the present invention are designed to emulate or utilize both Type I quantum computers and Type II quantum computers, which consist of a plurality of nodes each employing a relatively small number of qubits with classical communication between the nodes. These computers are described in Yepez, "Type-II Quantum Computers", *International Journal of Modern Physics C*, Vol. 12, No. 9, pp. 1273-1284 (2001).

Broadly, the systems of the present invention solve quantum wavefunction equations on a quantum computer or solves the quantum wavefunction equations by simulating the evolution of a quantum process at each node. A pseudorandom number generator is used on a classical computer to simulate the stochastic nature of the quantum process. The generator may be encoded in the application program for the computation or may, alternatively, be a separate hardware device. A quantum computer does not need a pseudorandom number generator but achieves randomness from the quantum process itself. The values of the initial points of the computation are entered into the computer and boundary conditions are imposed at the initial time and throughout the duration of the simulation. For example, in a solution of the Navier-Stokes equations momentum goes to a prescribed function or value such as zero at boundaries of the solution area. A condition of "bounce-back" or "reflection" is applied to keep any of the transient mass distributions from entering the boundary. The mass of a "particle" entering a boundary is redistributed into the mass of particles moving away from the boundary. Measurement of the wavefunction at a node is then simulated and the resulting measurements are exchanged with nearby nodes. On a qauntum computer the wavefunction at a node is measured and the results of that measurement are exchanged. The process is then repeated, i.e., the wavefunction evolves at each node; is simulated so as to allow it to be measured; and is then exchanged between the nodes. Computation for multiple dimensions is split into a series of computations along one-dimensional lines.

In our system, the evolution of the wavefunction at each of the nodes is a unitary process implemented by arranging that the normalized magnitude of the wavefunction $\Psi$ is always equal to one after each evolutionary step. A unitary operator U on a quantum wavefunction $\Psi$ ensures that, to the limit of experimental accuracy on a real quantum computer, the probability of the Hermitian inner product $\langle\Psi|\Psi\rangle$ is conserved. On a classical computer simulating a quantum computer the probability is conserved to within numerical roundoff on the classical computer. It is the preservation of the total probability through all the evolutionary steps which contributes significantly to the accuracy and lack of instability or overdamping of the quantum simulation method.

However, other equivalent formulations, processes, and configurations will be apparent to those skilled in the arts.

DESCRIPTION OF THE PREFERRED EMBODIMENTS

Figure 1:
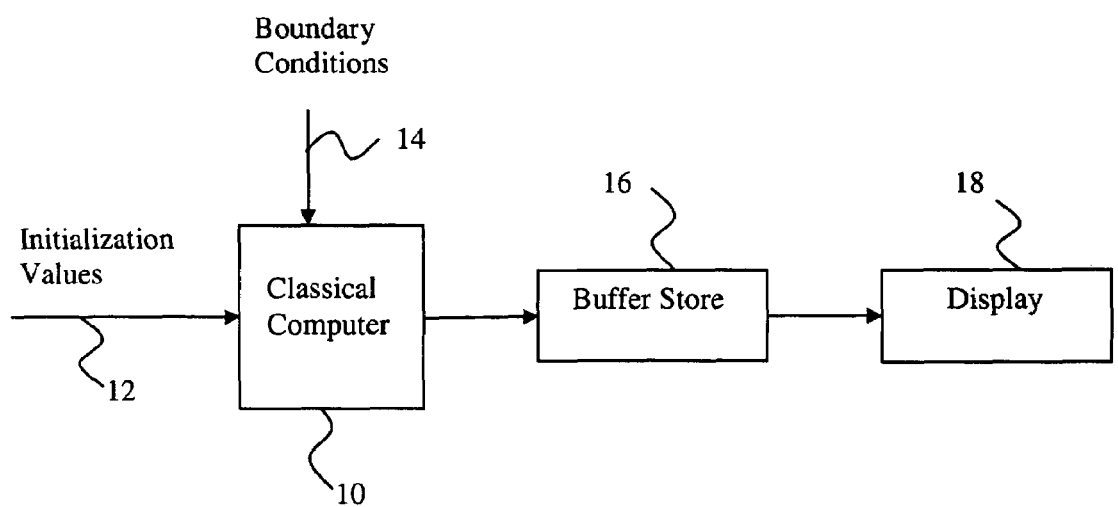
FIG. 1 is a block diagram broadly illustrating a preferred embodiment of apparatus for practicing the present invention.

FIG. 1 is a broad block diagram of a system embodying the present invention. Broadly, in the system of FIG. 1, a classic computer or quantum computer 10 is loaded with initialization values 12 and boundary conditions 14. The computer 10 then calculates the resulting physical conditions, prescribed by the mathematical equations being simulated, as the compuation proceeds from the initialized value as a function of time and space. The output of the computer 10, representing the states of the variable at subsequent times, is provided to a buffer store 16. From the buffer store it may be provided to a display 18 on either a real time or a delayed basis as still images, video images, movies, audio sound representations, and the like.

A typical physical problem which involves a mathematical expression so complex that it cannot be solved using classical computers in a straightforward manner is the fluid flow over complex physical terrains. Solutions to the Navier-Stokes equations, which are used to model the fluid flow physics, can be calculated to a high degree of precision in a preferred embodiment of our invention.

The compressible Navier-Stokes equations (NSE)

$$\rho\left(\frac{\partial u}{\partial t} + u \cdot \nabla u\right) = \mu \nabla^2 u - \nabla p + F \quad (1)$$

$$\frac{\partial \rho}{\partial t} + \nabla(\rho u) = 0, \quad (2)$$

can be approximately represented by quantum field equations. The approach is to use quantum lattice gas formulations of one dimension (J. Yepez, "Type-II Quantum Computers", *International Journal of Modern Physics C*, Vol. 12, No. 9, pp. 1273-1284 (2001); J. Yepez, "Quantum Lattice-Gas Model for Burger's Equation" *Journal of Statistical Physics*, Vol. 107, No. 1, pp. 203-224 (2002)) and extend them to three dimensions with complex geometry and implement a novel method of boundary conditions. The quantum lattice gas computations can be written as the lattic Boltzmann collision expansion of the occupation probability function $$P_a(x+\Delta x, t+\tau) = P_a(x,t) + \Omega_a(x,t) \quad (3)$$

where the collision term is given by $$\Omega_a(x,t) = \langle \Psi(x,t) | (\hat{U}^\dagger \hat{n}_a \hat{U}) - \hat{n}_a | \Psi(x,t) \rangle. \quad (4)$$

The Navier-Stokes equations are recovered from the expansion of the quantum lattice Boltzmann equation and then by forming quantum moment equations from it. In general $\hat{U}$ can be viewed as a block diagonal unitary matrix. The quantum wave function ket evolution operator for each site is given by $$|\Psi'(x,t)\rangle = \hat{U}|\Psi(x,t)\rangle \quad (5)$$

where the implementation we use below must satisfy constraints for each i=1,2,3 component as $$|(a^i)^2| + |(b^i)^2| + |(c^i)^2| + |(d^i)^2| = 1 \quad (6)$$

and $$a^i c^{i*} + b^i d^{i*} = a^{i*} c^i + b^{i*} d^i = 0. \quad (7)$$

Fluid dynamics can be constructed on grids of nodes with on-site qubits where quantum computations using unitary operations take place and connectng them with classical communications. It is possible to model one-dimensional fluid flow with as few as two or three qubits per node. Two qubits per node can be used to model the Burger's equation and three qubits per node can be used to model the one-dimensional Navier-Stokes equation becaue it can include a pressure gradient. The $i^{th}$ component of a three-dimensional qubit unitary matrix operator is $$\hat{U}^i = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & a^i & b^i & 0 & 0 & 0 \\ 0 & 0 & 0 & c^i & d^i & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}. \quad (8)$$

A key advantage of a quantum computer is that it is based on qubits, as opposed to bits, and exhibits $2^n$ computational complexity for n qubits and thus gain efficiency from quantum superposition. The quantum superposition of states for each qubit ket is represented as $$|q_a^i\rangle = \alpha_a^i|0\rangle + \beta_a^i|1\rangle. \quad (9)$$

This type of quantum computer implements quantum superposition by using on-site kets each of which are the direct product of the quibt kets. For a three qubit node a=0,1,2. The three qubit ket is $$|\Psi^i(x,t)\rangle = |q_0^i\rangle \otimes |q_1^i\rangle \otimes |q_2^i\rangle. \quad (10)$$

Expanding, explicitly the three qubit ket becomes $$|\Psi^i(x,t)\rangle = \beta_0^i \beta_1^i \beta_2^i |111\rangle + \beta_0^i \beta_1^i \alpha_2^i |110\rangle + \beta_0^i \alpha_1^i \beta_2^i |101\rangle$$
$$+ \beta_0^i \alpha_1^i \alpha_2^i |100\rangle + \alpha_0^i \beta_1^i \beta_2^i |011\rangle + \alpha_0^i \beta_1^i \alpha_2^i |010\rangle$$
$$+ \alpha_0^i \alpha_1^i \beta_2^i |001\rangle + \alpha_0^i \alpha_1^i \alpha_2^i |000\rangle. \quad (11)$$

The fine grained representation requires masses having different velocities to move between sites and interact by quantum unitary evolution in collisions. The $m_0$ mass does not move. The $m^1_2$ and $m^1_1$ masses move in the negative and positive x directions with velocity negative and positive one at each step. The $m^2_2$ and $m^2_1$ masses move on the negative and positive y directions with velocity negative and positive one. The $m^3_2$ and $m^3_1$ masses move on the negative and positive z directions with velocity negative and positive one.

In three dimensions the wave function ket governing the quantum properties is $$|\Psi(x,t)\rangle = |\Psi^1(x,t)\rangle \otimes |\Psi^2(x,t)\rangle \otimes |\Psi^3(x,t)\rangle, \quad (12)$$

where $$|\Psi^i(x,t)\rangle = |q_0^i\rangle \otimes |q_1^i\rangle \otimes |q_2^i\rangle \quad (13)$$

is the three-dimensional wavefunction component ket. The three qubit ket evolution becomes $$|\psi^{i'}(x,t)\rangle = \hat{U}^i |\psi^i(x,t)\rangle = \begin{pmatrix} \beta_0^i \beta_1^i \beta_2^i \\ \beta_0^i \beta_1^i \alpha_2^i \\ \beta_0^i \alpha_1^i \beta_2^i \\ a^i \beta_0^i \alpha_1^i \alpha_2^i + b^i \alpha_0^i \beta_1^i \beta_2^i \\ c^i \beta_0^i \alpha_1^i \alpha_2^i + d^i \alpha_0^i \beta_1^i \beta_2^i \\ \alpha_0^i \beta_1^i \alpha_2^i \\ \alpha_0^i \alpha_1^i \beta_2^i \\ \alpha_0^i \alpha_1^i \alpha_2^i \end{pmatrix} = \quad (14)$$

$$\begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & a^i & b^i & 0 & 0 & 0 \\ 0 & 0 & 0 & c^i & d^i & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \begin{pmatrix} \beta_0^i \beta_1^i \beta_2^i \\ \beta_0^i \beta_1^i \alpha_2^i \\ \beta_0^i \alpha_1^i \beta_2^i \\ \beta_0^i \alpha_1^i \alpha_2^i \\ \alpha_0^i \beta_1^i \beta_2^i \\ \alpha_0^i \beta_1^i \alpha_2^i \\ \alpha_0^i \alpha_1^i \beta_2^i \\ \alpha_0^i \alpha_1^i \alpha_2^i \end{pmatrix}$$

Using these equations to generate a display of fluid evolution over space and time begins by defining the density and the fluxes based on the geometry of the quantum gas lattice. Various schemes are possible and we have implemented several. The simulations generating the figures have been implemented using the following density and flux schemes. The density p is constructed from operations of the qubits and number operator, $\hat{n}$, $$\rho = 6\langle q_0|\hat{n}|q_0\rangle + \langle q_1^1|\hat{n}_2^1|q_1^1\rangle + \langle q_2^1|\hat{n}_2^1|q_2^1\rangle + \langle q_1^2|\hat{n}_1^2|q_1^2\rangle$$
$$+ \langle q_2^2|\hat{n}_2^2|q_2^2\rangle + \langle q_1^3|\hat{n}_1^3|q_1^3\rangle + \langle q_2^3|\hat{n}_2^3|q_2^3\rangle. \quad (15)$$

The flux is determined from differences as $$\rho v_x = -c(\langle q_2^1|\hat{n}_2^1|q_2^1\rangle - \langle q_1^1|\hat{n}_1^1|q_1^1\rangle), \quad (16)$$

$$\rho v_y = -c(\langle q_2^2|\hat{n}_2^2|q_2^2\rangle - \langle q_1^2|\hat{n}_1^2|q_1^2\rangle), \quad (17)$$

and $$\rho v_z = -c(\langle q_2^3|\hat{n}_2^3|q_2^3\rangle - \langle q_1^3|\hat{n}_1^3|q_1^3\rangle), \quad (18)$$

Figure 2:
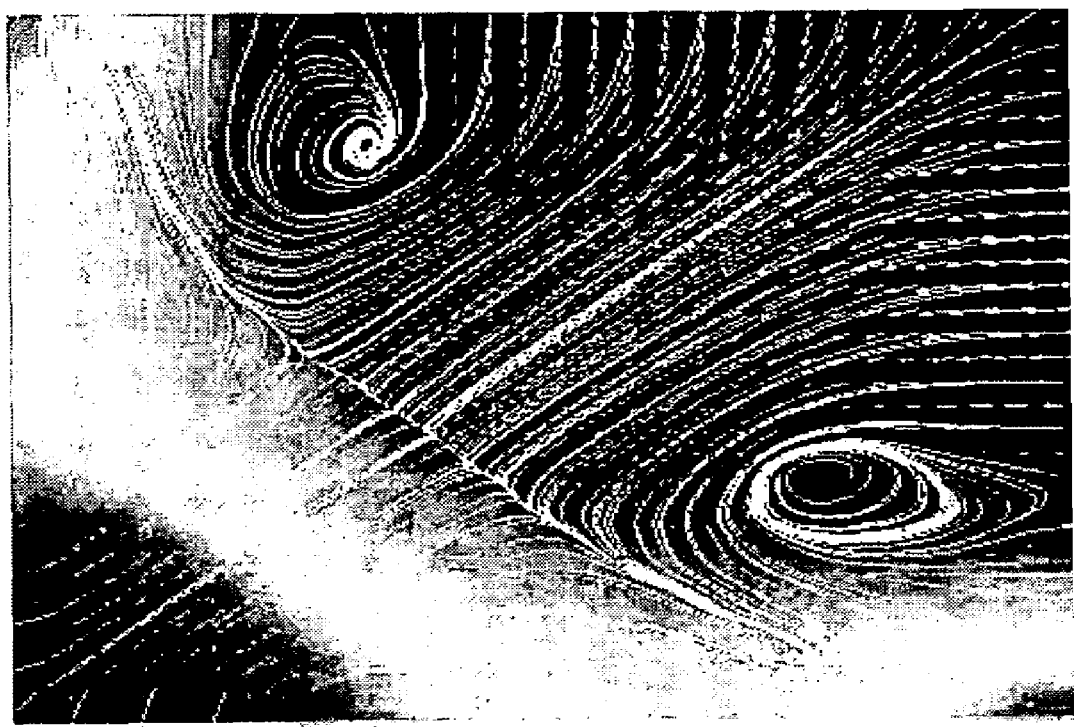
FIG. 2 is an image produced by the method of the present invention representing a flow pattern as a function of time in a box using a classical computer simulating a Type II quantum computer to solve two-dimensional compressible Navier-Stokes equation.

The numerical solutions resulting from these computations are fed to a buffer store 16 for use in either real time or delayed display on the output display unit 18. The output display unit 18 may be a computer monitor, still images, videos, movies, or audio sound representations produced representing the physical situation at a given time or as a function of time. FIG. 2 is an image of the display of velocity stream lines and density shading in a rectangular box using the system of the present invention. Initial conditions were such that the distribution of mass particles was divided into two parts, a portion of which were static and had zero momentun while the rest had momentun directed from the lower left to the upper right in the coordinate system of FIG. 2. Boundary conditions were reflective. After time evolution the display shows typical turbulent structures each as expansion and compression fronts and vertex dynamics.

Figure 3:
FIG. 3 is an image produced by the method of the present invention representing a flow pattern as a function of time around a helicopter in a test chamber generated by solving two-dimensional turbulent compressible Navier-Stokes equations.

FIG. 3 is an image of a display of two-dimensional flow around a two-dimensional model of a helicopter in a test chamber as well as corner vortices in the test chamber. Initial conditions were similar to those of FIG. 2.

Figure 4:
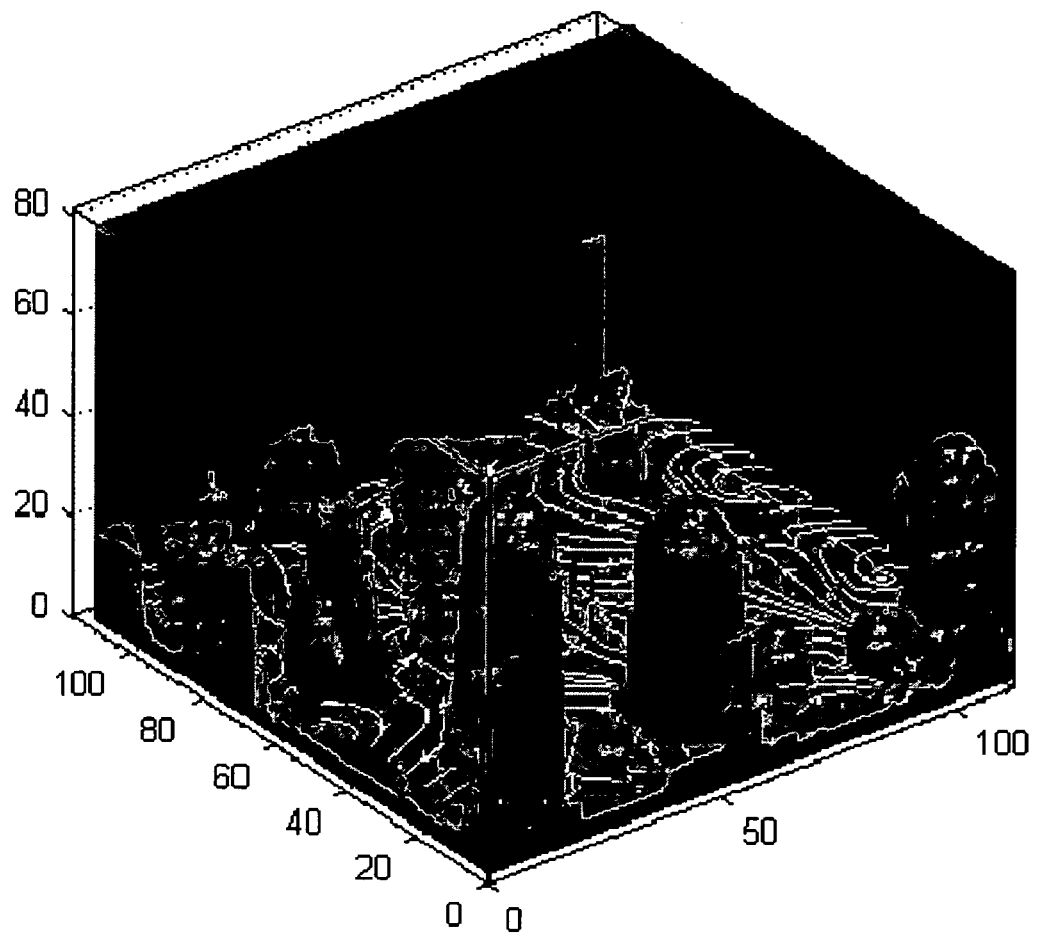
FIG. 4 is an image produced by the method of the present invention representing three-dimensional turbulent flow about the World Trade Center site produced by solving Navier-Stokes equations.

FIG. 4 is an image of three-dimensional urban Navier-Stokes turbulent flow illustrating wind velocity stream lines at 40 meter elevation above a computational base height at the World Trade Center site.

It is important to note that the process of the present invention produces turbulent flow dynamics flow which is always numerically stable and therefore the simulations are important for uses on classical computers as well as quantum compters.

Another embodiment of our invention generates displays representing solutions solving the Dirac equation as a simulation of a Type II quantum computer using a classic computer.

The Dirac equations govern the wavefunctions of fermions. The probability of measuring a fermion is given by the probability $$P = \Psi\Psi^*$$

for each of the four wavefunctions defined below. The Dirac equations may be represented as $$\left(\gamma \cdot \nabla + \gamma_4 \frac{\partial}{\partial (ix_0)}\right)\Psi + \frac{mc}{\hbar}\Psi = 0 \quad (19)$$

as given by Sakurai (*Advanced Quantum Mechanics*, Addison-Wesley, 1977) who also put the Dirac equations in nonconformist representation. Sakurai has represented the Dirac Hamiltonian as $$H = -ic\hbar \alpha \cdot \nabla + \beta mc^2 \quad (20)$$

with the Dirac equation as $$H\Psi = i\hbar \frac{\partial \Psi}{\partial t}$$

using his own definitions of $\alpha$ and $\beta$.

The Dirac equation was also represented by Yepez ("An efficient and accurate quantum algorithm for the Dirac Equation", quant-th/0210093) with his definitions of $\alpha$ and $\beta$.

$$\partial_t \Psi = c \sum_i \alpha_i \partial_i \Psi + i \frac{mc^2}{\hbar} \beta \Psi. \quad (21)$$

The Yepez nonconformist representation follow as $$\partial_t \Psi = c \sum_i \sigma_2 \otimes \sigma_i \partial_i \Psi + i\sigma_x \otimes I \frac{mc^2}{\hbar} \Psi. \quad (22)$$

Expanding in the Yepez unitary operator form for small space and time differential yields $$\Psi' = \Psi + \delta\Psi = {}_e\sum_i \sigma_z \otimes \sigma_i \delta r \partial_i + i\frac{mc^2}{\hbar}\delta t \sigma_x \otimes I\Psi.$$

This exponential unitary operator was decomposed by Yepez into quantum computer efficient second order accuracy unitary operator patterns $$\Psi' = Y^{(2)} S_x Y^{(2)t} X^{(2)t} S_y X^{(2)} S_z X^{(1)n} \Psi.$$

In the above, the operator matrices are defined as $$Y^{(2)} = \begin{pmatrix} \cos\theta & \sin\theta & 0 & 0 \\ -\sin\theta & \cos\theta & 0 & 0 \\ 0 & 0 & \cos\theta & \sin\theta \\ 0 & 0 & -\sin\theta & \cos\theta \end{pmatrix}$$

$$X^{(2)} = \begin{pmatrix} \cos\theta & i\sin\theta & 0 & 0 \\ -i\sin\theta & \cos\theta & 0 & 0 \\ 0 & 0 & \cos\theta & i\sin\theta \\ 0 & 0 & -i\sin\theta & \cos\theta \end{pmatrix}$$

$$X^{(1)} = \begin{pmatrix} \cos\theta & 0 & i\sin\theta & 0 \\ 0 & \cos\theta & 0 & i\sin\theta \\ -i\sin\theta & 0 & \cos\theta & 0 \\ 0 & -i\sin\theta & 0 & \cos\theta \end{pmatrix}$$

$$S_x \Psi(x_1, y_1, z_1) = \begin{pmatrix} \alpha(x_1+\delta r, y_1, z_1) \\ \beta(x_1+\delta r, y_1, z_1) \\ \mu(x_1+\delta r, y_1, z_1) \\ \nu(x_1+\delta r, y_1, z_1) \end{pmatrix}$$

$$S_y \Psi(x_1, y_1, z_1) = \begin{pmatrix} \alpha(x_1, y_1+\delta r, z_1) \\ \beta(x_1, y_1+\delta r, z_1) \\ \mu(x_1, y_1+\delta r, z_1) \\ \nu(x_1, y_1+\delta r, z_1) \end{pmatrix}$$

$$S_z \Psi(x_1, y_1, z_1) = \begin{pmatrix} \alpha(x_1, y_1, z_1+\delta r) \\ \beta(x_1, y_1, z_1+\delta r) \\ \mu(x_1, y_1, z_1+\delta r) \\ \nu(x_1, y_1, z_1+\delta r) \end{pmatrix}$$

$$\Psi(x_1, y_1, z_1) = \begin{pmatrix} \alpha(x_1, y_1, z_1) \\ \beta(x_1, y_1, z_1) \\ \mu(x_1, y_1, z_1) \\ \nu(x_1, y_1, z_1) \end{pmatrix}$$

The $\sigma_i$ are Pauli spin matrices and are $$\sigma_x = \begin{vmatrix} 0 & 1 \\ 1 & 0 \end{vmatrix}$$

$$\sigma_y = \begin{vmatrix} 0 & -i \\ i & 0 \end{vmatrix}$$

$$\sigma_z = \begin{vmatrix} 1 & 0 \\ 0 & -1 \end{vmatrix}$$

The term I is the identity matrix.

The direct products utilize the Pauli spin matrices and are given by $$\sigma_z \otimes \sigma_1 = \sigma_z \otimes \sigma_x = \begin{vmatrix} 1 & 0 \\ 0 & -1 \end{vmatrix} \otimes \begin{vmatrix} 0 & 1 \\ 1 & 0 \end{vmatrix} = \begin{vmatrix} 0 & 1 & 0 & 0 \\ 1 & 0 & 0 & 0 \\ 0 & 0 & 0 & -1 \\ 0 & 0 & -1 & 0 \end{vmatrix}$$

$$\sigma_z \otimes \sigma_2 = \sigma_z \otimes \sigma_y = \begin{vmatrix} 1 & 0 \\ 0 & -1 \end{vmatrix} \otimes \begin{vmatrix} 0 & -i \\ i & 0 \end{vmatrix} = \begin{vmatrix} 0 & -i & 0 & 0 \\ i & 0 & 0 & 0 \\ 0 & 0 & 0 & i \\ 0 & 0 & -i & 0 \end{vmatrix}$$

$$\sigma_z \otimes \sigma_3 = \sigma_z \otimes \sigma_z = \begin{vmatrix} 1 & 0 \\ 0 & -1 \end{vmatrix} \otimes \begin{vmatrix} 1 & 0 \\ 0 & -1 \end{vmatrix} = \begin{vmatrix} 1 & 0 & 0 & 0 \\ 0 & -1 & 0 & 0 \\ 0 & 0 & -1 & 0 \\ 0 & 0 & 0 & 1 \end{vmatrix}$$

and $$\sigma_x \otimes I = \begin{vmatrix} 0 & 1 \\ 1 & 0 \end{vmatrix} \otimes \begin{vmatrix} 1 & 0 \\ 0 & 1 \end{vmatrix} = \begin{vmatrix} 0 & 0 & 1 & 0 \\ 0 & 0 & 0 & 1 \\ 1 & 0 & 0 & 0 \\ 0 & 1 & 0 & 0 \end{vmatrix}$$

Still another embodiment of our invention simulates on classical computers the quantum computer solving the two-dimensional Schrödinger equation. The one and two-dimensional Schrödinger equations are $$-i\hbar\frac{\partial\Psi}{\partial t} = \frac{\hbar^2}{2m}\frac{\partial^2\Psi}{\partial x^2} + V\Psi$$

and $$-i\hbar\frac{\partial\Psi}{\partial t} = \frac{\hbar^2}{2m}\frac{\partial^2\Psi}{\partial x^2} + \frac{\hbar^2}{2m}\frac{\partial^2\Psi}{\partial y^2} + V\Psi$$

respectively where in Hamiltonian form they can be represented as $$H\Psi = -i\hbar\frac{\partial\Psi}{\partial t}$$

The simulation of the quantum computer solving the one-dimensional Schrödinger model follows the development given by Yepez ("An efficient and accurate quantum algorithm for the Dirac Equation", quant-th/0210093) and Boghosian ("An efficient and accurate quantum lattice-gas model for the many-body Schrödinger wave equation", *Computer Physics Communications*, Vol. 146, No. 3, pp. 280-294 (2002))

The local collision operator is $$U = \begin{vmatrix} 1 & 0 & 0 & 0 \\ 0 & \dfrac{1-i}{2} & \dfrac{1+i}{2} & 0 \\ 0 & \dfrac{1+i}{2} & \dfrac{1-i}{2} & 0 \\ 0 & 0 & 0 & -1 \end{vmatrix}$$

S is the streaming operation to the + direction and S' is the streaming operation in the − direction. The step sequence is then $|\Psi(t+\tau)\rangle = S'_2 US_2 US'_1 US_1 U|\Psi(t)\rangle$.

The subscripts on the S operators indicate which qbit is currently being streamed.

Initial conditions are Gaussian. A phase $e^{ipx}$ can be multiplied into $|\Psi\rangle$ to cause the particle to move $|\Psi_{moving}\rangle = e^{ipx}|\Psi\rangle$.

In a similar fashion the effects of an external potential can be applied by multiplying U by a phase change $U_{withphase} = e^{-iV(x)}U$.

The model may be extended to two dimensions by using a step sequence $|\Psi(t+\tau)\rangle = S'_{y2} US_{y2} US'_{y1} US_{y1} US'_{x2} US_{x2} US'_{x1} US_{x1} U|\Psi(t)\rangle$.

The order of the step sequence is similar to the sequence used in the Dirac equations, although the operators are different.

Simulations of quantum computers solving two-dimensional Schrödinger equations were successfully realized as a function of time. Wavefunctions and probabilities were computed of involving their interactions with potentials and scatters invovling complex shapes. Wavefunction interference patterns were obtained in the simulation of the two slit experiment. Solutions of the two-dimensional Schrödinger equation doulbe slit problem produced interference patterns in the downstream direction demonstrating consistent quantum wave coherence and correct quantum interference properites.

Patents, provisional patent applications, or publications mentioned in this specification are herein incorporated by reference to the same extent as if each individual publication was specifically and individually indicated to be incorporated by reference. In particular, provisional applications 60/493,096, filed Aug. 6, 2003, and 60/493,106, filed Aug. 6, 2003, are incorporated herein in their entirety.

However, other equivalent formulations, processes, configurations, and applications will be apparent to those skilled in the arts. The invention is not restricted to the illustrative examples described above. Examples are not intended as limitations on the scope of the invention. Changes therein, other combinations of equations, physical processes, applications, and other uses will occur to those skilled in the art. The scope of the claims represent the scope of the invention.

Having thus described our invention we claim:

1. A method of generating graphic displays or audio sound representations of a numerical solution of a physical process comprising:

using a classical computer to simulate computations of a simulated quantum computer by performing multi-dimensional computations comprising the solution to mathematical equations representing a simulated physical process as a series of single dimensional computations, employing pseudo-random number generators to simulate the stochastic nature of the quantum process, simulating measurement of the wavefunction produced by an operator U on a quantum wavefunction $\Psi$ at a node, exchanging information developed by the simulation with nearby nodes, maintaining conservation within a high precision in the simulated physical process by causing quantities in the simulated physical process to go to a prescribed value or function at a boundary of the solution and applying a reflection to keep any transient distributions from entering the boundary, and repeating until the numerical solution is complete; and generating a graphic display or audio sound representation of the numerical solution.

2. The method of claim 1 wherein the simulated quantum computer is a Type I quantum computer.

3. The method of claim 1 wherein the simulated quantum computer is a Type II quantum computer.

4. The method of claim 1 wherein $\langle\Psi|\Psi\rangle$, the Hermitian inner produce, is conserved establishing the nature of the operations as unitary.

5. The method of claim 1 wherein the multi-dimensional dimensional computations comprise the solution to the Navier-Stokes equation.

6. The method of claim 1 wherein numerical values representative of the mass of a particle entering a boundary are redistributed into numerical values representing the mass of particles leaving the boundary.

7. The method of claim 5 wherein the simulated physical process is fluid flow over a complex terrain as a function of space and time.

8. The method of claim 7 further comprising initializing the multi-dimensional computations with values representative of the simulated phsyical process in space and time.

9. The method of claim 1 wherein the multi-dimensional computations comprise the solutions to the Dirac equation to generate a graphic display of wavefunctions of fermions.

10. The method of claim 1 wherein the multi-dimensional computations comprise solutions of the Schrödinger equations.

11. A system for generating graphic displays or audio sound representations of a numerical solution of a physical process, comprising:

a classical computer;

an application program functional to cause the classical computer to simulate computations of a simulated quantum computer by having initialization values based on parameters of the problem, performing multi-dimensional computations comprising the solutions to mathematical equations representing a simulated physical process as a series of single dimensional computations, employing pseudo-random number generators to simulate the stochastic nature of the quantum process, and maintaining conservation within a high precision in the simulated physical process by causing quantities in the simulated physical process to go to a prescribed value or function at a boundary of the solution and applying a reflection to keep any transient distributions from entering the boundary, thereby producing a numerical solution; and a display system to receive outputs of the classical computer and to display graphic images or play audio sound representing of the numerical solution.

12. The system of claim 11 wherein the simulated quantum computer is a Type I quantum computer.

13. The system of claim 11 wherein the simulated quantum computer is a Type II quantum computer.

14. The system of claim 11 wherein the application program is operative to simulate measurement of a wavefunction produced by an operator U on a quantum wavefunction Ψ at a node and exchanging the information developed by the simulation with nearby nodes, and repeating until the computation is complete.

15. The system of claim 11 wherein the simulated physical process is fluid flow over a complex terrain modeled by computing solutions to the Navier-Stokes equation.

16. The system of claim 11 wherein the application program conserves ⟨Ψ|Ψ⟩, the Hermitian inner produce, as unitary.

17. The system of claim 11 wherein the multi-dimensional computations comprise solutions of the Schrödinger equations.

18. The system of claim 11 wherein the multi-dimensional computations comprise solutions to the Dirac equation to generate a graphic display of wavefunctions of fermions.

19. The system of claim 18 wherein the application program conserve ⟨Ψ|Ψ⟩, the Hermitian inner product, as unitary.

20. The system of claim 18 wherein boundary conditions are set so that physical variables go to prescribed functions or values consistent with the simulated physical process.

21. The system of claim 18 wherein the initialization values are set to functions or values consistent with the simulated physical process.

22. A method of generating graphic displays or audio sound representations of a numerical solution of a physical process by means of a quantum computer comprising:
    performing multi-dimensional computations comprising the solutions to mathematical equations representing a simulated physical process as a series of single dimensional computations, measuring the quantum wavefunction produced by an operator U on a quantum wavefunction Ψ at a node thereby directly exploiting the inherent stochastic nature of the quantum measurement process, maintaining conservation within a high precision in the simulated physical process by causing quantities in the simulated physical process to go to a prescribed value or function at a boundary of the solution and applying a reflection to keep any transient distributions from entering the boundary, exchanging information developed by the simulation with nearby nodes, and repeating until the numerical solution is complete; and
    generating a graphic display or audio sound representation of the numerical solution.

23. The method of claim 22 wherein the quantum computer is a Type I quantum computer.

24. The method of claim 22 wherein the quantum computer is a Type II quantum computer.

25. The method of claim 22 wherein ⟨Ψ|Ψ⟩, the Hermitian inner produce, is conserved.

26. The method of claim 22 wherein the multi-dimensional computations comprise a solution to the Navier-Stokes equation.

27. The method of claim 22 wherein numerical values representative of the mass of a particle entering a boundary are redistributed into numerical values representing the mass of particles moving away from the boundary.

28. The method of claim 26 wherein the simulated physical process is fluid flow over a complex terrain as a function of space and time.

29. The method of claim 28 further comprising initializing the multi-dimensional computations with values representative of the simulated physical process in space and time domain.

30. The method of claim 22 wherein the multi-dimensional computations comprise solutions to the Dirac equation to generate a graphic display of wavefunctions of fermions.

31. The method of claim 22 wherein the multi-dimensional computations comprise solutions of the Schrödinger equations.

32. A system for generating graphic displays or audio sound representations of a numerical solution of a physical process, comprising:
    a quantum computer;
    an application program for the quantum computer operative for performing multi-dimensional computations comprising solutions to mathematical equations representing a simulated physical process as a series of single dimensional computations, measuring the quantum wavefunction thereby directly exploiting the inherent stochastic nature of the quantum measurement process, and maintaining conservation within a high precision in the simulated physical process by causing quantities in the simulated physical process to go to a prescribed value or function at a boundary of the solution and applying a reflection to keep any transient distributions from entering the boundary, thereby producing a numerical solution; and
    a display system to receive outputs of the computer and to display graphic images or play audio sound representations of the numerical solution.

33. The system of claim 32 wherein the quantum computer a Type II quantum computer.

34. The system of claim 32 wherein the quantum computer a Type I quantum computer.

35. The system of claim 32 wherein the application program is operative to measure the wavefunction produced by an operator U on a quantum wavefunction Ψ at a node and to exchange the information developed by the simulation with nearby nodes, and to repeat the process until the computation is complete.

36. The system of claim 32 wherein the simulated physical process is fluid flow over a complex terrain modeled by computing solutions to the Navier-Stokes equations.

37. The system of claim 32 wherein the application program conseres ⟨Ψ|Ψ⟩, the Hermitian inner produce, as unitary.

38. The system of claim 32 in which the multi-dimensional computations comprise solutions of the Schrödinger equations.

39. The system of claim 32 wherein the multi-dimensional computations comprise solutions to the Dirac eqution to generate a graphic display of wavefunctions of fermions.

40. The system of claim 39 wherein the application program conserves ⟨Ψ|Ψ⟩, the Hermitian inner produce, as unitary.

41. The system of claim 39 wherein the boundary conditions are set so that physical variables go to prescribed functions or values consistent with the simulated phsyical process.

42. The system of claim 39 wherein initialization values are set to prescribed functions or values consistent with the simulated physical process.

* * * * *